(No Model.)
A. F. DENLINGER.
Gate.
No. 229,974. Patented July 13, 1880.
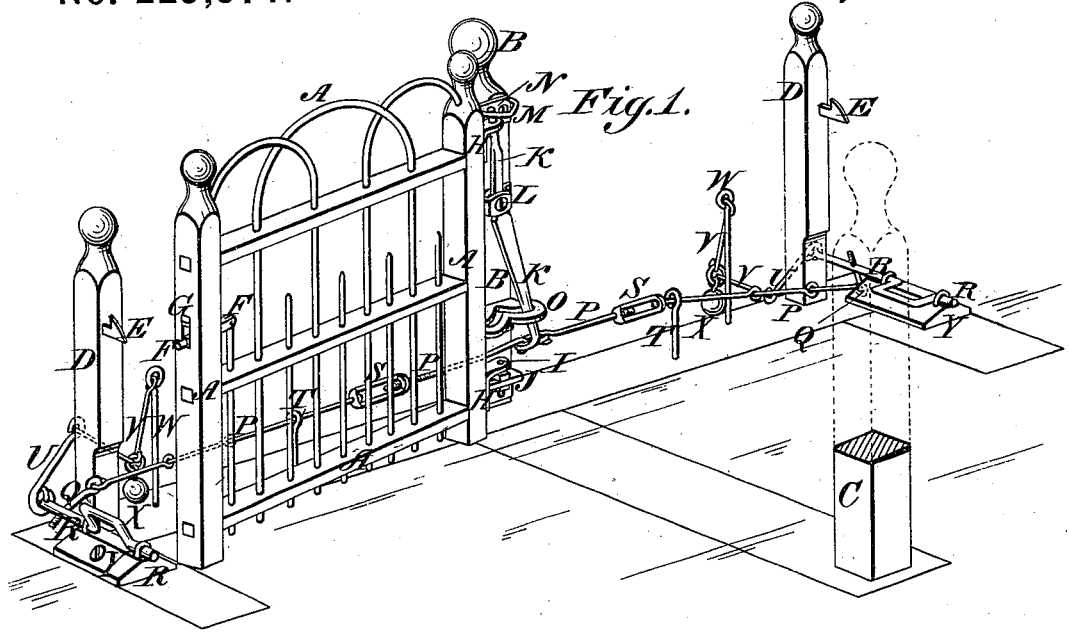
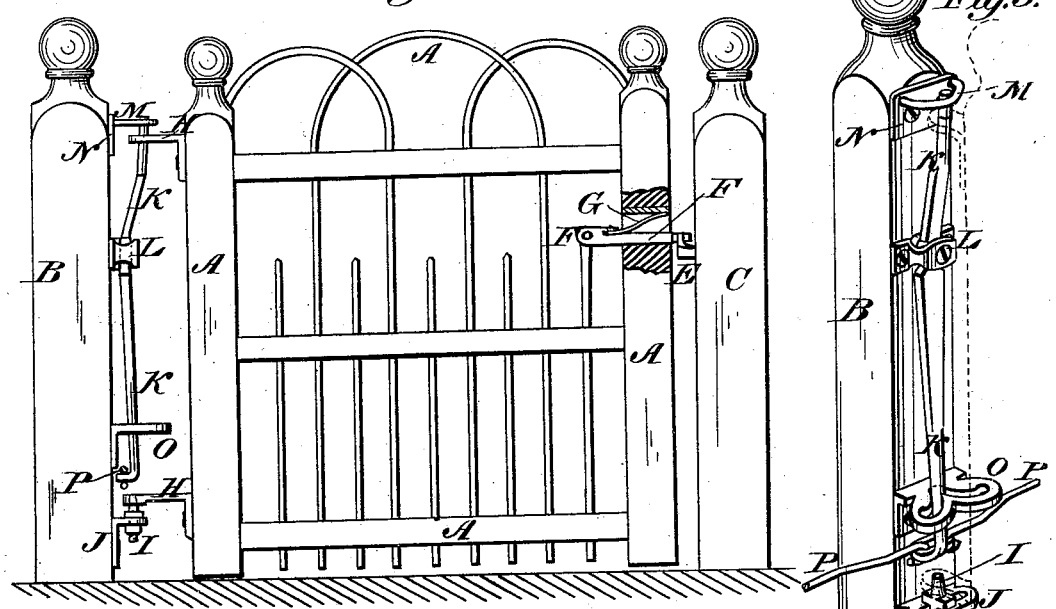
WITNESSES:
Donn P. Twitchell
C. Sedgwick
INVENTOR:
A. F. Denlinger
BY Munn & Co.
ATTORNEYS.

UNITED STATES PATENT OFFICE.

ABRAHAM F. DENLINGER, OF JAMTON, OHIO.

GATE.

SPECIFICATION forming part of Letters Patent No. 229,974, dated July 13, 1880.

Application filed May 13, 1880. (No model.)

*To all whom it may concern:*

Be it known that I, ABRAHAM F. DENLINGER, of Jamton, in the county of Montgomery and State of Ohio, have invented a new and useful Improvement in Farm-Gates, of which the following is a specification.

Figure 1 is a perspective view of the improvement, the gate being shown open. Fig. 2 is a side elevation of the gate closed. Fig. 3 is a perspective view of the rear or hinge post and its attachments.

Similar letters of reference indicate corresponding parts.

The object of this invention is to furnish farm-gates so constructed that they can be opened and closed by the wheels of a passing vehicle, and which shall be simple in construction and not liable to get out of order.

The invention consists in the combination, with the gate and its rear post, of the angle-plate having an eye, the pivoted lever, the angle-plate having a V-shaped slot, the loop, the chains or jointed rods, the rigid arms, and the crank-shafts, whereby the gate may be opened and closed by the passage of vehicle-wheels over the cranks of the crank-shafts; also, in the combination, with the upper eye-plate of the gate and the rear post, of the pivoted lever, the angle-plate having V-shaped slot, and the supporting-loop, whereby the gate can be opened and closed by the lateral movement of the ends of the lever.

A represents the gate, which may be made of any desired style. B is the rear or hinge post. C is the front post, and D are the side posts. The front and side posts, C D D, are provided with catches E to receive the latch F, to hold the gate A shut and open. The latch F passes through a slot in the front bar of the gate A, and its inner end is pivoted to a bar of the said gate or to a support attached to the gate. The latch F is held down by a spring, G, so that the latch F will fasten itself when the gate is swung shut and open.

To the upper and lower parts of the rear bar of the gate A are attached the vertical arms of the angle-plates H, the horizontal arms of which have holes or eyes in their outer ends to receive the pivots or pintles of the hinges. The lower pivot, I, is inserted in a slot in the horizontal arm of the angle-plate J, where it is secured in place by a nut screwed upon its lower end, so that it may be readily moved to adjust or center the gate A. The lower arm of the angle-plate J is attached to the hinge-post B.

The eye of the upper plate, H, receives and works upon the upper end of the lever K, which is pivoted to a keeper, L, attached to the forward side of the post B in such a manner that the ends of the lever K will have a lateral and a forward and back movement.

The upper end of the lever K is supported against the forward draft of the gate A by a loop, M, along the curve of which the said end moves, and which is attached to the post B, or is attached to or formed upon a plate, N, attached to the said post B. The lower part of the lever K passes through a V-slot in the horizontal arm of the angle-plate O, the vertical arm of which is attached to the post B. The plate O has shoulders formed in it at the ends of the V-slot to receive the lever K and prevent it from flying back.

To the lower end of the lever K is pivoted the inner ends of the two jointed rods or chains P, which extend in opposite directions along the side of the roadway, and their outer ends are pivoted to the outer ends of the arms Q, rigidly attached to the crank-shafts R, at right angles with the cranks of the said shafts, and in such positions that the said arms will point toward the gate A when the cranks of the said shafts R are projecting upward.

The chains or jointed rods P are provided with swiveled coupling-nuts S, so that the length of the said jointed rods or chains can be regulated as required. The chains or jointed rods P pass through guide-holes in posts T or other supports, to keep them from coming in contact with the ground when slackened.

To the crank-shafts R, and parallel, or nearly so, with the arms Q, are attached arms U in such a manner that when the cranks of the shafts R are turned down outward they will carry the arms U with them, but will not carry the said arms with them when the said cranks are turned down inward.

To the ends of the arms U are attached the ends of the short chains or jointed rods V, the other ends of which are attached to the upper ends of short posts W, set in the ground at a little distance from the shafts R.

To the centers of the chains or jointed rods V are attached weights X, of sufficient gravity to bring the cranks of the shafts R into a vertical position as soon as the said cranks are released from the wheels of the vehicle. The crank-shafts R are pivoted to the angles of double-inclined blocks Y, so that the cranks of said shafts can be turned down past a horizontal position in both directions.

With this construction, when a vehicle is approaching the gateway the driver so guides his team that the wheels of the vehicle will strike the crank of the crank-shaft R and push the said crank down toward the gate. This movement draws the lower end of the lever K toward the advancing team and pushes the upper end of the said lever K in the opposite direction. This movement first raises the forward end of the gate A, lifting the latch F out of the catch E, and then tilts the gate to one side, so that the weight of the gate A will swing it open, where it will be held by the latch F catching upon the catch E of the side post, D. As the vehicle passes through the gateway the driver so guides the team that the wheels of the vehicle will strike the crank of the other shaft R and push it outward. This movement reverses the movement of the lever K, unlatches the gate, and causes it to swing shut, so that the driver can open and close the gate by simply guiding his team to bring the wheels of the vehicle in contact with the cranks of the crank-shafts R.

Having thus fully described my invention, I claim as new and desire to secure by Letters Patent—

1. In a farm-gate, the combination, with the gate A and the post B, of the eye-plate H, the pivoted lever K, the angle-plate O, having V-shaped slot, the loop M, the chains or jointed rods P, the rigid arms Q, and the crank-shafts R, substantially as herein shown and described, whereby the gate may be opened and closed by the passage of vehicle-wheels over the cranks of the crank-shafts, as set forth.

2. In a farm-gate, the combination, with the upper eye-plate, H, of the gate A and the post B, of the lever K, the angle-plate O, having V-shaped slot, and the supporting-loop M, substantially as herein shown and described, whereby the gate can be opened and closed by the lateral movement of the ends of the lever K, as set forth.

ABRAHAM F. DENLINGER.

Witnesses:
PIERCE FRYANT,
MARTIN DENLINGER.